United States Patent
Morimoto et al.

(10) Patent No.: US 9,370,846 B2
(45) Date of Patent: Jun. 21, 2016

(54) PROCESS FOR PRODUCING COMBUSTOR STRUCTURAL MEMBER, AND COMBUSTOR STRUCTURAL MEMBER, COMBUSTOR FOR GAS TURBINE AND GAS TURBINE

(75) Inventors: Hitoshi Morimoto, Hyogo-ken (JP); Masaki Taneike, Hyogo-ken (JP); Tomoto Nagai, Hyogo-ken (JP)

(73) Assignee: MITSUBISHI HITACHI POWER SYSTEMS, LTD., Tokyo (JP)

( * ) Notice: Subject to any disclaimer, the term of this patent is extended or adjusted under 35 U.S.C. 154(b) by 1175 days.

(21) Appl. No.: 12/789,084

(22) Filed: May 27, 2010

(65) Prior Publication Data
US 2010/0300115 A1    Dec. 2, 2010

(30) Foreign Application Priority Data
Jun. 2, 2009    (JP) .................. 2009-133394

(51) Int. Cl.
*F02C 1/00* (2006.01)
*B23P 15/00* (2006.01)
*F23R 3/00* (2006.01)

(52) U.S. Cl.
CPC ............... *B23P 15/00* (2013.01); *F23R 3/002* (2013.01); *B23P 2700/13* (2013.01); *F23R 2900/00018* (2013.01); *Y10T 29/49616* (2015.01)

(58) Field of Classification Search
CPC ............. F23R 3/002; F23R 3/06; F23R 3/007
USPC .................. 60/752, 796, 772; 428/297.4; 29/407.05, 407.08, 889.2; 148/627, 148/639, 714, 651, 610, 650
See application file for complete search history.

(56) References Cited

U.S. PATENT DOCUMENTS 5,036,913 A *   8/1991   Murphy et al. ............... 165/173
6,701,599 B2 *  3/2004   Stubler et al. ............... 29/426.4
(Continued)

FOREIGN PATENT DOCUMENTS

JP       64-15274 A    1/1989
JP       5-92214 A     4/1993
(Continued)

OTHER PUBLICATIONS

International Search Report of PCT/JP2010/058506, dated of mailing Aug. 24, 2010.
(Continued)

*Primary Examiner* — Lindsay Low
*Assistant Examiner* — Omar Morales
(74) *Attorney, Agent, or Firm* — Westerman, Hattori, Daniels & Adrian, LLP

(57) ABSTRACT

A process including brazing a first plate-like member formed from a heat-resistant alloy, and a second plate-like member formed from a heat-resistant alloy and having fins on the surface, with the fins facing the first plate-like member, by interposing a brazing filler metal comprising a melting point lowering element between the two plate-like members, molding the plate-like assembly to form a combustor structural member, identifying, in accordance with the shape of the combustor structural member, strain locations where the strain generated during the press molding step exceeds a predetermined value, performing localized heating of the locations within the plate-like assembly corresponding with the strain locations identified, and as the above press molding step subjecting the plate-like assembly to cold press molding with the temperature of the heated locations corresponding with the strain locations maintained at a desired temperature.

11 Claims, 2 Drawing Sheets

(56) References Cited

U.S. PATENT DOCUMENTS

| | | | |
|---|---|---|---|
| 7,156,282 B1 * | 1/2007 | Renaud et al. | 228/122.1 |
| 7,158,922 B2 * | 1/2007 | Sadagopan et al. | 703/2 |
| 2007/0067986 A1 * | 3/2007 | Chitty et al. | 29/812.5 |

FOREIGN PATENT DOCUMENTS

| | | | |
|---|---|---|---|
| JP | 2001-304551 A | | 10/2001 |
| JP | 2001304551 A | * | 10/2001 |
| JP | 2001-326114 A | | 11/2001 |
| JP | 2002-161755 A | | 6/2002 |
| JP | 2002161755 A | * | 6/2002 |
| JP | 2003-049253 A | | 2/2003 |
| JP | 2006-231345 A | | 9/2006 |
| JP | 3831638 B2 | | 10/2006 |
| JP | 2008-200836 A | | 9/2008 |

OTHER PUBLICATIONS

Written Opinion of the International Searching Authority (Form PCT/ISA/237) of International Application No. PCT/JP2010/058506 mailed Aug. 24, 2010.

Decision to Grant a Patent dated Jun. 18, 2013 for Korean Application No. 10-2011-7017525. (2 pages), with English-language Concise Explanation of Relevance (1 page).

A Decision to Grant a Patent issued in Nov. 19, 2013, in corresponding Japanese Application No. 2009-133394 w/English Concise statement. (4 pages).

Decision to Grant a Patent dated Mar. 13, 2014, issued in Chinese Patent Application No. 201080006121.7, w/ English concise statement of relevance (3 pages).

Decision to Grant a European Patent dated Oct. 8, 2015 issued in counterpart European patent application No. 10783263.6. (1 page).

\* cited by examiner

PROCESS FOR PRODUCING COMBUSTOR STRUCTURAL MEMBER, AND COMBUSTOR STRUCTURAL MEMBER, COMBUSTOR FOR GAS TURBINE AND GAS TURBINE

CROSS REFERENCE TO RELATED APPLICATION

This application claims benefit of Japanese Patent Application No. 2009-133394 filed in Japan on Jun. 2, 2009, the content of which is incorporated herein by reference.

BACKGROUND OF THE INVENTION

1. Field of the Invention

The present invention relates to a process for producing a combustor structural member that can be used (as the combustion liner and combustor basket and the like) within a combustor of a gas turbine.

2. Description of Related Art

Gas turbine combustors are used under high-temperature conditions at approximately 1,500° C. As a result of these operating conditions, such gas turbine combustors require cooling structures. For example, the Publication of Japanese Patent No. 3,831,638 (claim 9 and paragraph [0011]) discloses the use of a plate-like member having hollow passages formed therein, known as an MT fin, as the structural member for the transition piece of a combustor, wherein the gas turbine combustor is cooled by passing a cooling medium such as air or steam through the hollow passages.

As disclosed in Japanese Unexamined Patent Application, Publication No. 2002-161755 (paragraph [0007]), a plate-like member having hollow passages formed therein may be constructed from a flat plate-like member that functions as the base metal, and a plate-like member having a plurality of fins, wherein the hollow passages are formed by bonding the plurality of fins to the flat plate-like member. An example of the bonding method employed is brazing (diffusion bonding). Brazing is a technique in which a metal (the brazing filler metal) having a lower melting point than the materials to be bonded (the base metals) is used as an adhesive, and bonding is achieved by heating the base metals to the melting temperature of the brazing filler metal, thereby causing an interdiffusion effect between the brazing filler metal and the base metals. If the heating temperature during brazing is too high, then oxidation and coarsening of the crystal grains of the base metals may occur, resulting in a deterioration in the strength of the base metals. Accordingly, brazing filler metals containing one or more added melting point lowering elements (such as B, Si or P) are widely used to reduce the heating temperature.

Conventionally, the aforementioned structural members for gas turbine combustors are produced by brazing two plate-like members together, and subsequently performing molding at normal temperatures using a pressing machine. During the brazing, the melting point lowering element(s) contained within the brazing filler metal diffuse out from the contact surfaces between the brazing filler metal and the plate-like members. However, in those cases where this diffusion is insufficient, the melting point lowering element(s) tend to become concentrated on the plate-like members near the above contact surfaces, resulting in localized brittleness. If a plate-like assembly formed from such plate-like members is subjected to press molding, then cracks may develop within the interior of the plate-like assembly, and these cracks tend to cause problems of detachment at the bonded surfaces of the plate-like assembly. Consequently, the internal quality of combustor structural members formed by molding of plate-like assemblies has needed to be checked by nondestructive testing (such as ultrasonic testing). If cracks are detected in a combustor structural member, then the combustor structural member must be either repaired by welding or discarded.

If the plate-like assembly having hollow passages formed therein is molded using a hot forging press machine, then the problem of cracks occurring within the interior of the plate-like assembly can be avoided. However, because this technique requires heating at a high temperature, the brazing filler metal and the plate-like members tend to melt, which makes it difficult to maintain the positional precision of the hollow passages, and tends to cause the plate-like members to suffer from coarsening of the crystal grains, resulting in a deterioration in the strength of the plate-like members. Hot press molding is a technique in which the entire material that is to be molded, such as a non-iron metal, stainless steel, alloy steel or carbon steel, is heated in a heating furnace or the like, and is subsequently subjected to compression molding using a die. In contrast, cold press molding is a technique in which the material to be molded is subjected to compression molding using a die at ambient temperature.

BRIEF SUMMARY OF THE INVENTION

The present invention has been developed in light of the above circumstances, and provides a process for producing a combustor structural member by molding a plate-like assembly having hollow passages formed therein that has been prepared by brazing two plate-like members, wherein the process causes no cracking and is able to maintain the positional precision of the hollow passages.

In order to address the problems outlined above, the process for producing a combustor structural member according to the present invention employs the aspects described below.

The present invention provides a process for producing a combustor structural member, the process comprising a plate-like assembly formation step of brazing a first plate-like member formed from a heat-resistant alloy, and a second plate-like member formed from a heat-resistant alloy and having a plurality of fins on a surface thereof, with the second plate-like member positioned with the fins facing the first plate-like member, by interposing a brazing filler metal comprising a melting point lowering element between the two plate-like members, thereby forming a plate-like assembly, a press molding step of press molding the plate-like assembly to form a combustor structural member of the desired shape, a strain location identification step of identifying, in accordance with the shape of the combustor structural member, strain locations where the strain generated during the press molding step exceeds a predetermined value, a localized heating step of performing localized heating of the locations within the plate-like assembly corresponding with the strain locations identified in the strain location identification step, and a cold press molding step, which is performed as the above press molding step and comprises subjecting the plate-like assembly to cold press molding with the temperature of the heated locations corresponding with the strain locations maintained at a desired temperature.

Depending on the shape of the combustor structural member, the strain locations that occur during molding of the plate-like assembly will vary. By identifying the strain locations within the combustor structural member, localized heating can be performed at those locations within the plate-like assembly corresponding with the identified strain locations prior to molding. By performing this localized heating of the plate-like assembly, the ductility can be improved, thereby improving the press moldability of the assembly. In other words, even in the case of a plate-like assembly in which the melting point lowering element(s) (such as B, Si or P) have diffused non-uniformly during brazing, press molding can be conducted without generating cracks. Further, be heating only those locations where strain is generated rather than the entire plate-like assembly, coarsening of the crystal grains within the entire plate-like assembly can be suppressed, and the positional precision of the hollow passages can be maintained.

In the invention described above, the heating temperature during the localized heating step is preferably not less than 650° C. and not more than 1,000° C., and is more preferably not less than 800° C. and not more than 1,000° C.

Ensuring that the heating temperature during the localized heating is not less than 650° C. and not more than 1,000° C. improves the press moldability of the plate-like assembly. In particular, by performing the heating at a temperature of not less than 800° C. and not more than 1,000° C., a plate-like assembly that has developed localized brittleness as a result of non-uniform diffusion of the melting point lowering element(s) contained within the brazing filler metal can be imparted with a level of ductility equal or superior to that exhibited by the first plate-like member and second plate-like member prior to embrittlement. Further, because the heating temperature is lower than the melting point of the brazing filler metal and the plate-like members, both the strength of the plate-like members and the positional precision of the hollow passages formed within the plate-like assembly can be maintained.

If the heating temperature is lower than 650° C., then the heating is unable to produce the desired ductility improvement effect. If the heating temperature exceeds 1,000° C., then the crystal grains of the plate-like members tend to coarsen, resulting in a degradation of the plate-like members. Furthermore, if the heating temperature exceeds 1,000° C., then the brazing filler metal and the plate-like members may melt, causing blocking of, and a deterioration in the positional precision of, the hollow passages.

The combustor structural member produced using the production process described above suffers no cracking during press molding. Accordingly, considerable cost reductions can be achieved as a result of a reduction in the time required for welding repair work and a reduction in the number of discarded members. Furthermore, the positional precision of the hollow passages can be maintained. A gas turbine combustor formed using the above combustor structural member and a gas turbine equipped with such a gas turbine combustor can be produced at low cost and exhibit excellent reliability.

By producing the combustor structural member using the production process described above, cracking generated during molding can be avoided. Accordingly, the time required for repair work and the production costs can both be reduced. Furthermore, the positional precision of the hollow passages can be maintained, even after molding. As a result, a gas turbine combustor that exhibits a superior cooling effect can be provided.

DETAILED DESCRIPTION OF THE INVENTION

An embodiment of the process for producing a combustor structural member according to the present invention is described below, with reference to the drawings.

Figure 1:
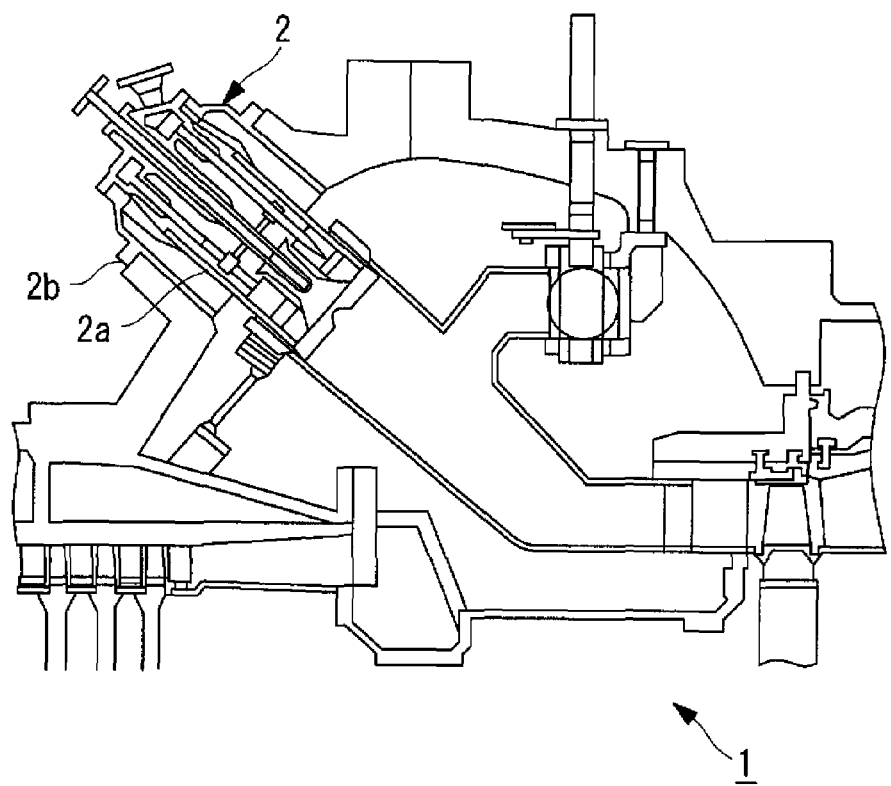
FIG. 1 is a partial longitudinal sectional view of a gas turbine according to an embodiment of the present invention.

FIG. 1 illustrates a partial longitudinal sectional view of a gas turbine according to the embodiment. The gas turbine 1 is equipped with a combustor 2 having a combustor basket 2a and an outer cylinder 2b. The combustor basket 2a is produced by provisionally arranging four combustor structural members, and then using laser welding to join the members to form a cylinder. Each of the combustor structural members is obtained by press molding a plate-like assembly having hollow passages formed therein into a predetermined shape. A single combustor structural member has dimensions, for example, within a range from 1.2 m×0.7 m to 1.0 m×0.5 m.

Figure 2:
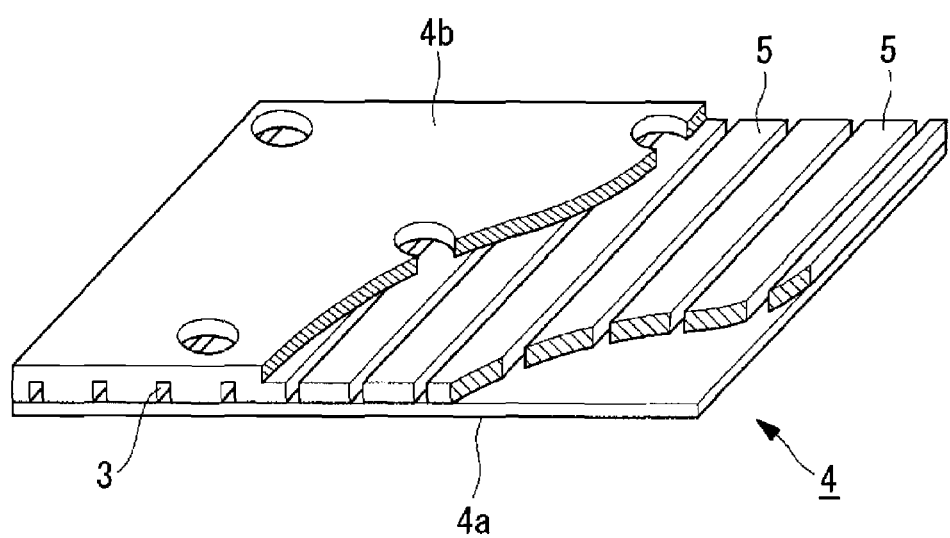
FIG. 2 is a perspective sectional view of a plate-like assembly.

FIG. 2 shows a perspective view of a plate-like assembly. The plate-like assembly 4 is composed of a first plate-like member 4a having a flat shape, and a second plate-like member 4b having a plurality of fins 5. In the plate-like assembly 4, by bonding the first plate-like member 4a to the plurality of fins 5, hollow passages 3 are formed between the plurality of fins 5 inside the plate-like assembly 4.

Figure 3:
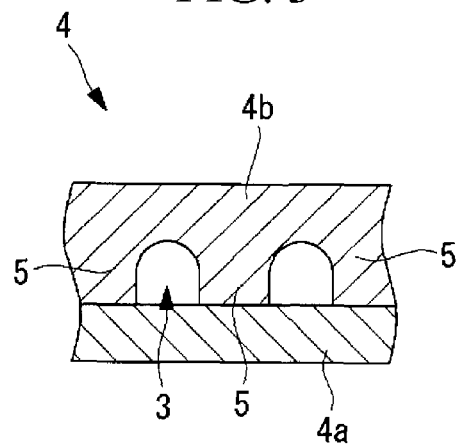
FIG. 3 is a partial sectional view of the plate-like assembly.

FIG. 3 is a partial sectional view of the plate-like assembly 4. When viewed in cross-section, the hollow passages 3 have a curved peak portion, the two ends of which are connected by a straight line.

The plate-like assembly 4 is prepared, for example, using the steps outlined below. A foil of a brazing filler metal (not shown in the drawings) is placed on top of the first plate-like member 4a, and the second plate-like member 4b is then mounted on top of the foil with the fins 5 facing the first plate-like member 4a. A brazing stop-off agent (not shown in the drawings) is applied around the edges of the bonding surface of each member. Following mounting of the second plate-like member 4b, a block or the like is used to apply a uniform in-plane pressure from the upper surface of the second plate-like member 4b. With this pressure applied, the first plate-like member 4a and the second plate-like member 4b are subjected to a heat treatment, either within an inert atmosphere or within a vacuum, thereby bonding the first plate-like member 4a and the second plate-like member 4b.

In this embodiment, the first plate-like member 4a and the second plate-like member 4b are formed from a heat-resistant Ni-based alloy such as Tomilloy (a registered trademark) (composition: Cr: 20.00 to 24.00% by mass, Co: 6.50 to 9.40% by mass, Mo: 8.00 to 10.00% by mass, W: 2.00 to 4.00% by mass, Al: 0.75 to 1.50% by mass, Ti: not more than 0.60% by mass, C: not more than 0.15% by mass, Fe: not more than 3.00% by mass, Mn: not more than 1.00% by mass, Si: not more than 1.00% by mass, Cu: not more than 0.50% by mass, S: not more than 0.015% by mass, P: not more than 0.020% by mass, B: not more than 0.006% by mass, and Ni: the remainder). As alternatives to Tomilloy (a registered trademark), Hastelloy (a registered trademark) X (composition: Cr: 20.25 to 23.25% by mass, Co: 0.45 to 2.55% by mass, Mo: 7.90 to 10.10% by mass, Fe: 16.80 to 20.20% by mass, W: 0.16 to 1.04% by mass, C: 0.04 to 0.16% by mass, Si: not more than 1.05% by mass, Mn: not more than 1.3% by mass, P: not more than 0.045% by mass, S: not more than 0.035% by mass, and Ni: the remainder) or other heat-resistant Ni-based alloys such as HA-230, GTD-222, IN-617 and Nimonic 263 may also be used. Alternatively, heat-resistant Co-based alloys such as HA-188 and FSX-414 may also be used.

In the present embodiment, the brazing filler metal comprising a melting point lowering element (such as B, Si or P) may be selected appropriately in accordance with the material of the plate-like members. For example, in those cases where a heat-resistant Ni-based alloy is used as the plate-like members, brazing filler metals comprising Ni as the main component may be used, including NIB8 (manufacturer: Hitachi Metals, Ltd., product name: Ni—B8, composition: C: not more than 0.1% by mass, Cr: 15.0 to 15.7% by mass, B: 3.3 to 4.0% by mass, and Ni: the remainder) and MBF-20 (manufacturer: Metglas Inc., product name: Metglas (a registered trademark) MBF-20 Nickel-based Brazing Foil, composition: C: not more than 0.06% by mass, Cr: 7.0% by mass, Fe: 3.0% by mass, Si: 4.5% by mass, B: 3.2% by mass, and Ni: the remainder).

A process for producing the combustor structural member is described below.

The process for producing the combustor structural member comprises a strain location identification step of identifying, in accordance with the shape of the combustor structural member, strain locations that are generated during molding, a localized heating step of heating those locations within the plate-like assembly 4 corresponding with the strain locations identified in the combustor structural member, and a press molding step of subjecting the heated plate-like assembly 4 to cold press molding.

In the strain location identification step, numerical analyses (press molding simulations) and the scribed circle test and the like are used to measure the strain within the combustor structural member, and strain locations that are generated during molding are identified in accordance with the shape of the combustor structural member.

For example, using the physical property values for the material of the plate-like assembly 4 as input data, a simulation analysis is performed (analysis software: LS-DYNA or the like) using factors such as the die temperature, the die shape and the lubricant (coefficient of friction) as parameters, and strain locations where the strain exceeds a predetermined value, for example a strain value of 13% or greater, are identified. The locations within the plate-like assembly corresponding with these identified strain locations are determined by software analysis.

For example, in a scribed circle test, circular patterns (scribed circles) with a diameter of approximately 6.35 mm (¼ inch) are marked on the plate-like assembly 4, and following press molding, the strain (such as the maximum strain, minimum strain, and maximum strain direction) within the plate-like assembly 4 is measured based on the degree of deformation (the lengths of the major axis and minor axis, the direction of the central axis, and the center-to-center spacing between circles) in the scribed circles. Strain locations are identified visually as those locations where the scribed circles have undergone significant deformation. Strain locations where the strain exceeds a predetermined value, for example a value of 13% or greater, are identified.

The plate-like assembly 4 is placed in the lower die. A lubricant is applied to the die and the plate-like assembly 4 to prevent scratching caused by friction during molding. Examples of the lubricant include lubricants having excellent lubricity at high temperature such as boron nitride (including the products BN Release manufactured by Audec Corporation, BN Spray manufactured by Zikusu Industry Co., Ltd., and BN Spray manufactured by Fine Chemical Japan Co., Ltd.).

In the localized heating step, following placement of the plate-like assembly 4 within the die in the manner described above, those locations within the plate-like assembly 4 corresponding with the strain locations identified in the strain location identification step are subjected to localized heating. Examples of heating methods that may be employed include induction heating, high-frequency heating or ohmic heating or the like. The minimum heating surface area is approximately 100 cm$^2$. The heating temperature is not less than 650° C. and not more than 1,000° C. The heating temperature can be controlled using a temperature choke, thermoviewer and/or thermocouple or the like.

In order to confirm the material properties of the first plate-like member 4a containing the diffused melting point lowering element(s), tensile tests were performed in accordance with JIS G0567 and JIS Z2241. A first plate-like member 4a was cut from a plate-like assembly 4 formed from Tomilloy (a registered trademark) so as to include a melting point lowering element diffusion layer, and a test piece was prepared in accordance with JIS Z2201. A test piece prepared from a plate-like assembly 4 that used MBF-20 as the brazing filler metal was used as example 1, and a test piece prepared from a plate-like assembly 4 that used NIB8 as the brazing filler metal was used as example 2. Further, a test piece prepared from Tomilloy (a registered trademark) was used as a comparative example.

Figure 4:
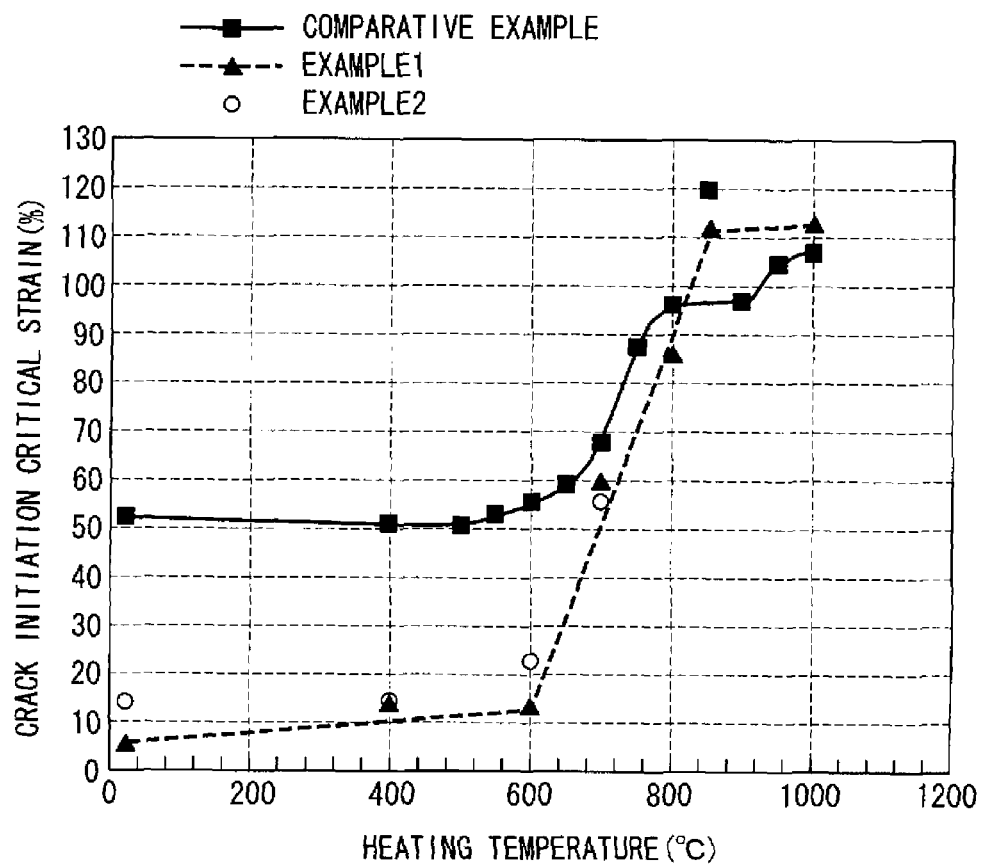
FIG. 4 is a graph illustrating the results of tensile tests.

FIG. 4 is a graph illustrating the results of the tensile tests performed on the above test pieces. In the figure, the horizontal axis represents the test piece heating temperature, and the vertical axis represents the crack initiation critical strain (%) for the test piece. The expression "crack initiation critical strain (%)" describes the strain (%) at the point where the test piece fractures. The crack initiation critical strain for the test pieces at room temperature was 51% for the comparative example, but not more than 13% for example 1 and example 2.

At a heating temperature of 650° C., the crack initiation critical strain values increased significantly. The crack initiation critical strain values for example 1 and example 2 at a heating temperature of 700° C. were equal or superior to that of the comparative example at room temperature, and at 800° C. were 80% or higher, which represents substantially the same result as that observed for the comparative example at the same temperature.

Based on the above tensile test results, it was determined that in order to achieve the desired ductility improvement effect without melting the plate-like assembly 4, the heating temperature during the localized heating step was preferably not less than 650° C. and not more than 1,000° C. The most favorable ductility improvement effect was obtained when the temperature was not less than 800° C. and not more than 1,000° C.

In the press molding step, following completion of the localized heating step, the plate-like assembly 4 is subjected to cold press molding with the temperature of the heated locations corresponding with the strain locations maintained at a desired temperature. Because the heated locations are only the identified strain locations, molding can be performed within a cold forging press machine.

As described above, using the process for producing a combustor structural member according to the present embodiment yields the effects described below. Namely, by producing the combustor structural member using the production process described above, cracking generated during molding can be avoided. Accordingly, the time required for repair work and the production costs can both be reduced. Furthermore, the positional precision of the hollow passages 3 can be maintained even after molding. As a result, a gas turbine combustor that exhibits a superior cooling effect can be provided.

The press molding step may be executed while the localized heating is performed.

In the present embodiment, the molding was performed in a single stage, but in the case of molding performed over two or more stages, the localized heating step and the press molding step may be performed repeatedly.

What is claimed is:

1. A process for producing a combustor structural member, the process comprising:

brazing a first plate-like member formed from a heat-resistant alloy, and a second plate-like member formed from a heat-resistant alloy and having a plurality of fins on a surface thereof, with the second plate-like member positioned with the fins facing the first plate-like member, by interposing a brazing filler metal comprising a melting point lowering element between the first and second plate-like members, thereby forming a first plate-like assembly, identifying strain locations in a second plate-like assembly where a strain exceeds a predetermined value after being press-molded into a desired shape, said second plate-like assembly having been formed by brazing a third plate-like member formed from the first heat-resistant alloy and having a plurality of fins on surface thereof with the fourth plate-like member positioned with the fins facing the third plate-like member, by interposing the brazing filler metal comprising the melting point lowering element between the third and fourth plate-like members, prior to press-molding, determining the locations within the first plate-like assembly corresponding to the identified strain locations within the second plate-like assembly, performing localized heating of the determined locations within the first plate-like assembly, and then subjecting the first plate-like assembly to cold press molding while maintaining a temperature of the determined locations subjected to the localized heating at a desired temperature.

2. The process for producing a combustor structural member according to claim 1, wherein a heating temperature within the localized heating step is not less than 650° C. and not more than 1,000° C.

3. The process for producing a combustor structural member according to claim 1, wherein a heating temperature within the localized heating step is not less than 800° C. and not more than 1,000° C.

4. A combustor structural member, produced using the process for producing a combustor structural member according to claim 1.

5. A combustor for a gas turbine, molded using the combustor structural member according to claim 4.

6. A gas turbine, comprising the combustor for a gas turbine according to claim 5.

7. The process for producing a combustor structural member according to claim 1, wherein a temperature of the localized heating is lower than melting points of the brazing filler metal, the first plate-like member, and the second plate-like member, and wherein the first and second plate-like members are heated to a temperature in which a level of ductility equal or superior to that exhibited by the first plate-like member and the second plate-like member prior to embrittlement.

8. The process for producing a combustor structural member according to claim 1, wherein the heat-resistant alloy is formed from a heat-resistant Ni-based alloy or a heat-resistant Co-based alloy.

9. The process for producing a combustor structural member according to claim 1, wherein the strain locations where the strain in the second plate-like assembly exceeds the predetermined value are identified by performing a simulation analysis using physical property values for a material of the second plate-like assembly as input data, and using a die temperature, a die shape, and a coefficient of friction of a lubricant as parameters.

10. The process for producing a combustor structural member according to claim 1, wherein the strain locations where the strain in the second plate-like assembly exceeds the predetermined value are identified using a degree of deformation after the press-molding of circular patters with a predetermined diameter marked on the second plate-like assembly.

11. The process for producing a combustor structural member according to claim 1, wherein the cold press molding is subjected to the first plate-like assembly while the localized heating is performed.

* * * * *